United States Patent [19]

Heller

[11] 3,764,906

[45] Oct. 9, 1973

[54] STORED CHARGE DETECTION BY CHARGE TRANSFER

[75] Inventor: Lawrence Griffith Heller, Essex Junction, Vt.

[73] Assignee: International Business Machines Corporation, Armonk, N.Y.

[22] Filed: Oct. 1, 1971

[21] Appl. No.: 185,604

[52] U.S. Cl. .................................... 324/111, 320/1

[51] Int. Cl. ......................... G01r 1/00, H02m 3/06

[58] Field of Search ..................... 324/111; 307/205, 307/246; 317/235, 21.1, 333; 320/1

[56] References Cited

UNITED STATES PATENTS 3,414,807 12/1968 Evans ................................ 324/111

*Primary Examiner*—Rudolph V. Rolinec
*Assistant Examiner*—Ernest F. Karlsen
*Attorney*—Francis J. Thornton et al.

[57] ABSTRACT

The amount of charge stored in a charge storage system can be transferred with negligible loss from the storage system to a charge detector without regard to the size of any distributed capacitance present on the line transferring the charge. This is achieved by charging a detector capacitor and the capacitance of the transfer line, to a reference voltage, allowing the stored charge system and the transfer line capacitance to equalize at a voltage level below the reference voltage, and transferring charge from the detector capacitor to the line capacitance and the charge storage system to return the line and the charge storage system to the reference voltage of charge. The voltage remaining on the detector capacitor is then equal to the original state of charge in the storage system.

A particular circuit for performing this method in conjunction with semiconductor memory arrays is also disclosed.

13 Claims, 4 Drawing Figures

INVENTOR
LAWRENCE G. HELLER

BY Francis J. Thornton
ATTORNEY

STORED CHARGE DETECTION BY CHARGE TRANSFER

BACKGROUND OF THE INVENTION

1. Field of the Invention

This invention relates generally to stored charge measuring systems.

The invention further relates to monolithic integrated semiconductor structures having storage arrays therein for digital signals and means associated therewith for readout of the stored signals.

2. Description of the Prior Art

Semiconductor devices, such as the well known FET or field effect transistor have been used in arrays to provide logic and storage capabilities. Such arrays include first and second sets of electrical conductors with the memory exhibiting devices thereto. The first set of conductors are known as word lines and the second set of conductors are known as bit lines and the memory exhibiting devices are connected to each set of lines at selected crossover points. Each device at such a crossover point may be thought of as a bit location with the state of device at a selected crossover point representing, in binary language, either a "1" or a "0," depending upon the stored charge in the device. A particular bit may be stored or written into a particular device by applying simultaneously a voltage on one line of each set of conductors. Reading of the stored information may be performed by applying a voltage on both sets of conductors and detecting a response on one of the lines.

Circuits for transferring charge from one capacitor to a second capacitor are also known.

U.S. Pat. No. 3,414,807 discloses a digital voltmeter which employs the method of discharging a large capacitor in steps into a small capacitor so as to measure the ratio of two potentials. Initially, the larger capacitor is charged to an unknown potential and the second smaller capacitor is then alternately connected across the first capacitor and short circuited repeatedly until the potential on the first capacitor has decreased to equal a specified reference potential.

U.S. Pat. No. 3,526,783 teaches a multiple phase gating system, comprising a first gating means for charging the output capacitor and the inherent capacitance of a two terminal logic network during a recurring clock signal. Thus each time the gating means is applied to the output capacitance, the output is unconditionally set to a specified value and the logic network precharged to prevent charge splitting.

U.S. Pat. No. 3,543,046 teaches a capacitance measurement technique whereby a relative capacitance of a first capacitor may be measured by providing a second reference capacitor and a switch that cyclically charges and discharges the two capacitors at a predetermined rate to provide two currents which can be algebraically summed and compared to indicate the relative difference between the two capacitances.

SUMMARY OF THE INVENTION

It is an object of the invention to provide an improved circuit for measuring a stored capacitive charge.

It is also an object of the invention to provide a novel method of transferring and measuring a stored charge regardless of any capacitances associated with the transfer line which couples the storage position to the measurement position.

It is still another object of the invention to provide a semiconductor memory cell measuring device that can be easily fabricated and is compatible with the present solid state integrated circuit technologies and techniques.

It is a further object of the invention to provide a circuit that can be used to measure the presence or absence of charge in a semiconductor body without influencing or adding error to the measurement.

It is still a further object of the invention to provide a circuit that can be used to transfer and amplify charges out of a semiconductor array which charges represent binary bits of information.

These and other objects of the present invention, are particularly realized in a circuit for transferring a stored charge from a storage capacitor to a measurement device via a transfer line, having large parasitic capacitances associated therewith. The circuit accomplishes this purpose by setting a reference voltage level on the transfer line to pre-charge a capacitance associated with the line to prevent the line from degrading the stored charge during its transfer via the line to the measurement device. The circuit thus effectively transfers charges stored on a storage capacitor out of the storage capacitor to a detector with negligable loss regardless of the size of any capacitance that may be associated with the transfer line.

The foregoing and other objects, features and advantages of the invention will be apparent from the following more particular detailed description of a preferred embodiment of the invention as illustrated in the accompanying drawings.

DESCRIPTION OF THE PREFERRED EMBODIMENTS

Figure 1:
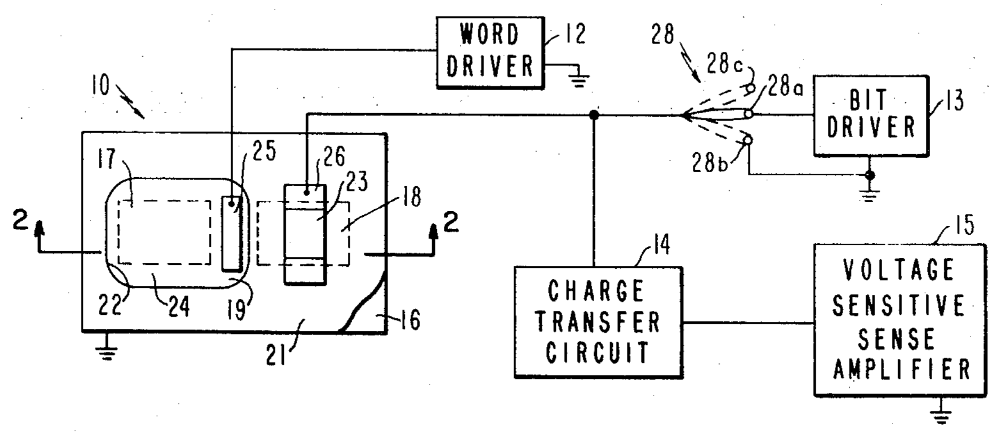
FIG. 1 illustrates the invention as it would appear when used with a single semiconductor storage cell.
Figure 2:
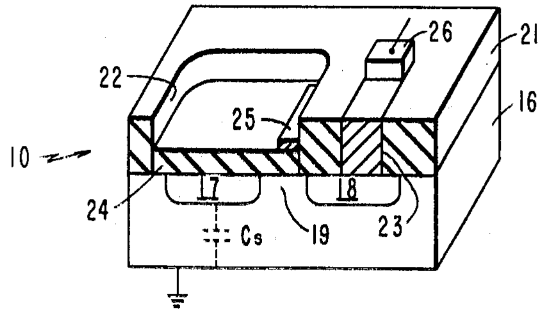
FIG. 2 is a cross-sectional view of the device of FIG. 1, taken along the lines 2—2.

Referring now to the drawing and more particularly to FIGS. 1 and 2, the principles of the inventive concepts of the present invention as contained in one embodiment will be described in detail.

For purposes of illustration only, FIGS. 1 and 2 show different views of a single semiconductor Field Effect Transistor (FET) 10, acting as a storage cell, coupled to operational circuits such as a word driver 12, a bit driver 13, a charge transfer system 14 embodying the present invention and a bit sense amplifier 15.

The cell 10 preferably is formed of a body 16 of homogeneous elementary semiconductor material having a diffused source 17, and a diffused drain 18, each of a conductivity type opposite to that of the body 16, separated from each other by a gate region 19. For purposes of illustration only, it will be assumed that the body 16 is formed of P-type germanium of silicon or preferably 1.0 to 2.0 ohm-centimeter material; and, N-type dopants are used to form diffusions 17 and 18.

Overlying the surface of the body is an insulating layer 21. This layer 21 may be, for example, composed of silicon dioxide formed by conventional techniques and having a thickness of approximately 8,000 Angstroms. This layer 21 is modified by known and conventional methods; such as, etching and oxide regrowth to create an opening 22 in the oxide 21 and reform over the source 17 and the gate region 19, a thinner oxide layer 24, having a thickness of about 500 Angstroms. A via hole 23 is also etched through the oxide layer 21 overlying the drain region 18.

Finally, a conductive gate electrode 25 is laid down over thin oxide 24 and over the gate region 19. Also a bit sense line 26 is laid down over oxide 21 so as to contact the drain 18 through via hole 23. The material used for such electrodes preferably is aluminum and has a thickness of approximately 8,000 Angstroms and may be formed, for example, by the evaporation and etching techniques well known and practiced in the semiconductor art.

Various methods and techniques for forming the layer, the depressions, the gate oxides, the electrodes, the vehicles and the diffusions are well known to those familiar with the semiconductor art and any specific description is not intended to be limiting, since other techniques could be used.

The gate electrode 25 is connected to the word driver 12, while the bit sense line 26 is connected through a first switch 28 to the bit driver 13 and through the charge transfer circuit 14 to the sense amplifier 15. The switch 28 is a three-position switch operative to either connect the bit line, through lead 28*a* to the bit line driver 13 or through lead 28*b* to ground or to an open position through lead 28c. Because source 17 is only connected through the body 16 to ground, a storage capacitance $C_s$ is created between the source diffusion 17 and the body 16, which is grounded. This capacitance $C_s$ is capable of storing a known charge, the presence of which represents a "1" in binary language, and the absence of which represents a "0." The thus described FET 10 can be used as a memory cell.

Figure 3:
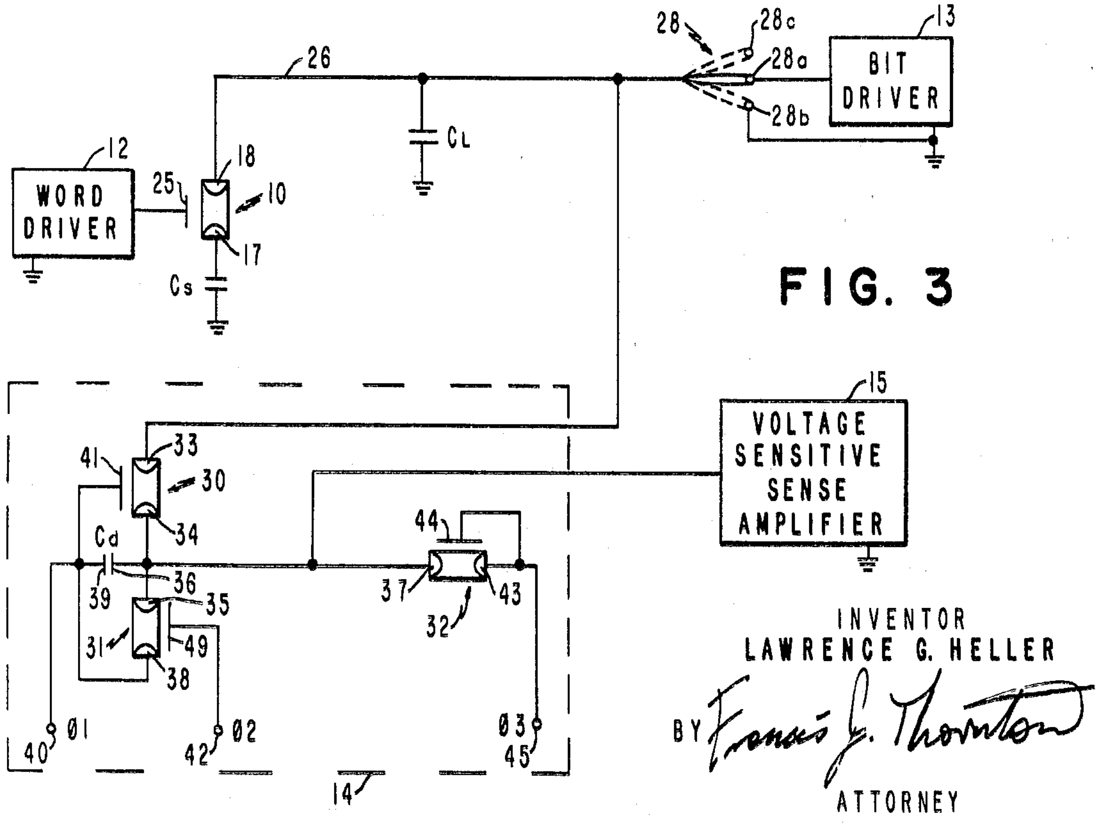
FIG. 3 illustrates schematically the equivalent circuit of the present invention.

FIG. 3 illustrates schematically the equivalent circuit of the cell and associated circuitry of FIG. 1. In this figure FET 10 is shown as having its source 17 coupled through the storage capacitance $C_s$ to ground, its gate electrode 25 coupled to the word driver 12 and its drain 18 connected to the bit/sense line 26. The bit/sense line 26 is, in turn, coupled through a distributed line capacitance $C_L$, which may be a parasitic capacitance, to ground, through switch 28 to the bit driver 13 and through the charge transfer circuit 14 to the voltage sensitive sense amplifier 15. In detail, the charge sensitive transfer circuit 14 comprises three FET devices 30, 31 and 32. Source 33 of FET 30 is coupled to the bit sense line 26, while its drain 34 is connected to the source 35 of FET 31, to one plate 36 of a detector capacitor $C_d$, to the source 37 of FET 32 and to the sense amplifier 15. The drain 38 of FET 31 is in turn coupled to the other plate 39 of capacitor $C_d$, to an input terminal 40, and to the gate 41 of FET 30. The detector capacitor $C_d$ is made to be equal to the storage capacitor $C_s$. The gate 49 of FET 31 is in turn connected to an input terminal 42. The drain 43 and the gate 44 of FET 32 are coupled together and to an input terminal 45.

In such FET devices the size of the capacitor $C_s$ is directly related to the size of the source 17 and is approximately 0.05 picofarads per square mil. Thus with present intergrated circuits techniques $C_s$ is normally quite small; e.g., considerably less than 0.1 picofarads. The distributed line capacitor $C_L$ associated with the bit/sense 26 is on the other hand quite large and can range from 1 picofarads to over 10 picofarads depending upon the size of the array, etc.

Because the storage capacitance $C_s$ is quite small; and the distributed line capacitance $C_L$ is quite large, it is difficult to detect the difference between a stored "0" and a stored "1," unless the ratio (called K) of the bit/sense line capacitance $C_L$ and the storage capacitance $C_s$ is small.

Typical so called latching circuits, now used to detect stored charges in such FET memory cells, are limited to a K value of between six and eight with an output voltage separation (including noise) between a "1" and a "0," being much less than a volt; e.g., about 300 millivolts. The reason for such poor performance on the part of presently used latching circuits is because they are unable to eliminate or diminish the effect of any distributed line capacitances as does the present invention.

Because the charge transfer circuit, of the present invention, not only effectively transfers the stored charge out of the device to a detection capacitor, it so diminishes the effect of the line capacitance that K values of about 100, can now be utilized. This means that arrays using the present invention can have more bits per bit/sense line. Alternately the storage capacity of the storage cell can be reduced meaning that smaller cells can be utilized and increased density realized.

Figure 4:
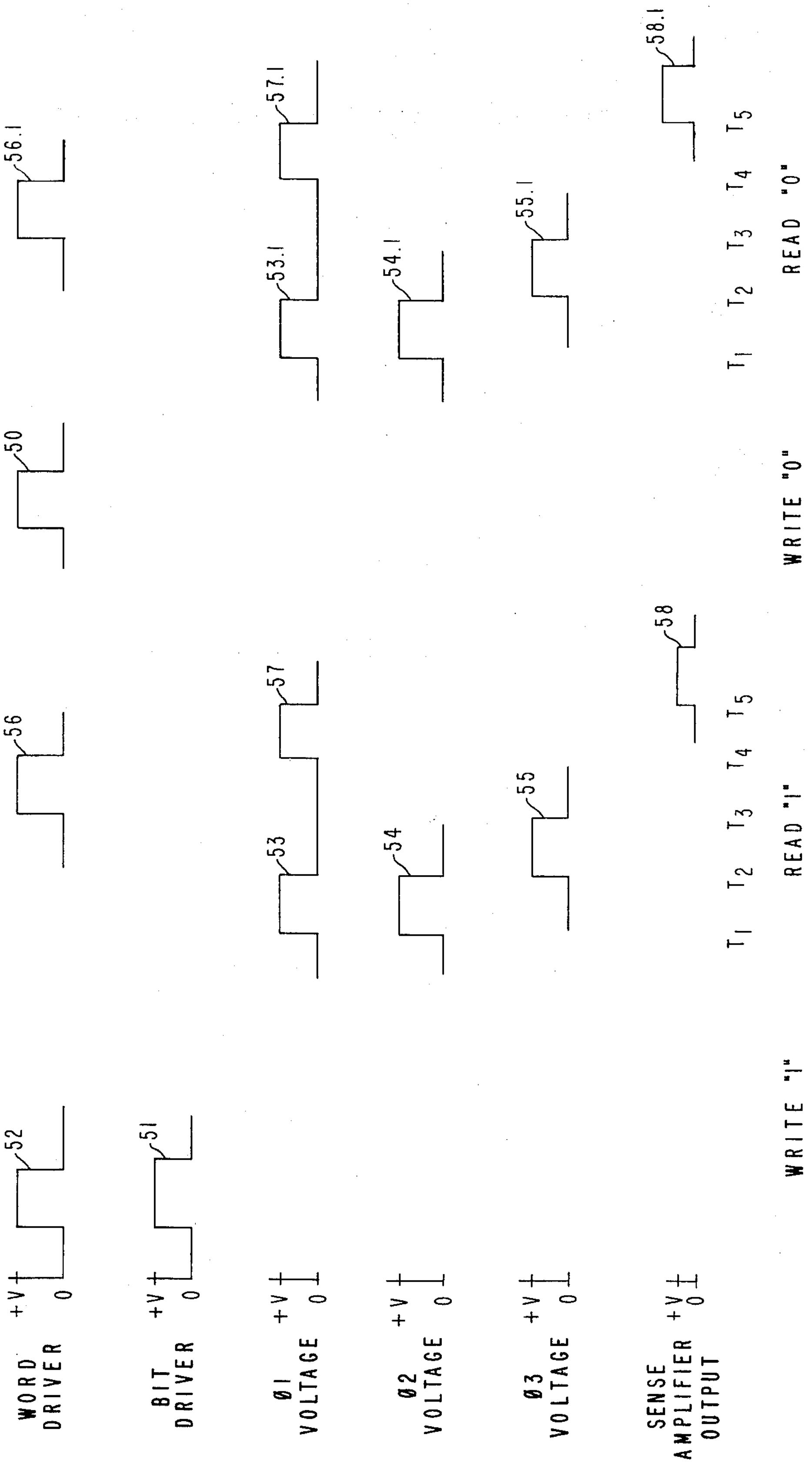
FIG. 4 illustrates the voltage pulses applied to the circuit of the present invention to read and write binary information into and out of the memory cell of FIG. 1.

If reference is now made simultaneously to FIGS. 3 and 4, the operation of the invention will be described in detail. As noted above, FIG. 3 illustrates the invention schematically while FIG. 4 shows the voltage pulse pattern required to write binary information in the cell or to read the information out of the cell.

When a "1" is to be written into the memory cell, the switch 28 is connected to the bit driver 13 and the bit/sense line 26 has a positive voltage pulse 51 of say about ten volts applied thereto by bit driver 13. Simultaneously, the gate electrode 25 is also driven positive by a positive voltage pulse 52 from the word driver 12. This pulse 52 must be great enough to exceed the threshold voltage of the FET 10, so as to turn on FET 10. A pulse of about 12 volts should be sufficient to exceed the threshold voltage. When the FET 10 turns on, the diffusions 17 and 18 are electrically connected to each other causing diffusion 18 to become biased at the level of diffusion 17; i.e., the level of bit sense line 26. Thus capacitor $C_s$ will store a charge indicative of a "1" signal. To assure that the stored charge remains in the capacitor $C_s$, it is necessary that the work pulse 52 shut off before the bit pulse 51 ends. This electrically disconnects the diffusions 17 and 18 causing diffusion 17 to remain fixed at the charge level to which it was set.

Reading of the state of the memory cell, that is, the state of capacitor $C_s$, is accomplished by the following sequence. At time $T_1$ the bit/sense line 26 is connected to the open position 28*c* of switch 28, and positive voltage pulses 53 and 54 of 01 and 02, respectively, 53 being about 10 volts and 54 being about 12 volts from switchable d.c. power supplies, (not shown) are applied to the terminals 40 and 42, respectively, of the charge transfer circuit 14. Pulse 53 is thus applied to gate 41 of FET 30 causing it to turn on connecting capacitor $C_d$ to the bit/sense line 26. Pulse 54 is simultaneously applied to gate 49 of FET 31, causing it to turn on thus connecting the bit/sense line 26 to the terminal 40. Current thus flows from the d.c. power supply coupled to terminal 40 through FET's 31 and 30 to the bit/sense line 26 to charge the line capacitance $C_L$ to a reference voltage $V_R$, which is that voltage sufficient to bias the source 33 of FET 30 at its cutoff level turning off FET 30. Thus the charge set on capacitor $C_L$ is equal to pulse 01 less the threshold voltage of FET 30. Once the capacitor $C_L$ is charged, pulses 53 and 54 turn off i.e., are reduced to zero volts, at time $T_2$ . Thus terminals 40 and 42 are also brought to and held at zero volts. After pulses 53 and 54 turn off, a third pulse 55 of 03, of about 10 volts, is now applied to terminal 45 to turn on FET 32. The voltage difference now existing across capacitor $C_d$ causes capacitor $C_d$ to charge up to the voltage level of pulse 55 less the threshold voltage of FET 32. This means the voltages applied to capacitor $C_L$ and $C_d$ are approximately equal in value.

When pulse 55 terminates at time $T_3$, the word driver applies a positive pulse 56 to the gate 25 of FET 10 coupling the storage capacitor $C_s$ to the distributed line capacitance $C_L$, which allows charge to flow between $C_s$ and $C_L$ to cause the voltages on these two capacitors to equalize. This drives the much smaller capacitor $C_s$ towards the voltage $V_R$ set on the much larger line capacitance $C_L$.

Normally, the voltage on capacitor $C_s$ when storing a "1" is about 7 volts, but under worst case conditions, due to leakage, etc., the capacitor $C_s$ when storing a "1" will have but 3 volts stored thereon. For the described charging conditions, the line capacitance $C_L$ will have about 9 volts stored thereon.

This means that when FET 10 becomes turned on and the capacitor $C_s$ and $C_L$ are connected in parallel capacitor $C_L$ is discharged to some level below 9 volts.

At time $T_4$ pulse 56 turns off causing FET 10 to turn off and a pulse 57 (01) is applied once again to terminal 40 causing FET 30 to turn on. Current now flows from capacitor $C_d$ through FET 30 until the capacitor $C_L$ and is again charged towards voltage $V_R$. This flow of charge or current thus is equal in value to the amount required to charge the storage capacitor $C_s$ up towards $V_R$. Therefore, when pulse 57 turns off, the amount of charge now remaining on capacitor $C_d$, which was established as equal in capacitance to the storage capacitor $C_s$, is substantially equal in value to the original charge contained on the storage capacitor $C_s$. If at time $T_5$, the sense amplifier 15 is read, a pulse 58 having a voltage level of between 2 volts and 6 volts would be read at its output indicating that only a small amount of charge was needed to restore capacitor $C_L$ up towards voltage level $V_R$.

Conversely, a binary "0" is written into the cell by connecting the bit/sense line 26 and thus diffusion 18 to ground through switch 28. When the bit/sense line 26 is so coupled to ground, a positive voltage pulse 50 in excess of the threshold voltage (say 12 volts) is applied to gate electrode 25 of FET 10 by word driver 12 causing FET 10 to turn on. When FET 10 becomes so turned on, the diffusion 17 becomes connected to diffusion 18 held at ground potential by the grounded bit/sense line 26. Thus diffusion 17 is also pulled to ground potential. This causes the capacitor $C_s$ to be discharged. Once the capacitor $C_s$ is so discharged, gate 25 of FET 10 is dropped below threshold voltage and the FET 10 shuts off holding capacitor $C_s$ in a discharged state, thus a "0" has been stored in the device.

To reach such a "0" stored in capacitor $C_s$, the same procedure is followed as was followed to read a "1" stored in the device. That is, at time $T_1$ positive voltage pulses 53.1 (10 volts) and 54.1 (12 volts) of 01 and 02, respectively, are applied to the terminals 40 and 42, respectively, of the charge transfer circuit 14 causing FET's 30 and 31 to turn on to connect the bit/sense line to the terminal 40, so that current will flow to the bit/sense line to charge the line capacitor $C_L$. Once again the capacitor $C_L$ charges up to the reference voltage $V_R$ and FET 30 shuts off. When capacitor $C_L$ is so charged, pulses 53.1 and 54.1 turn off i.e., are reduced to zero volts and a third pulse 55.1 (10 volts) from 03 is applied to terminal 45 to turn on FET 32. This voltage difference across capacitor $C_d$ permits the capacitor $C_d$ to charge up to the voltage level $V_R$. After pulse 55.1 terminates the word line driver applies a positive pulse 56.1 (12 volts) to the gate 25 of FET 10 coupling the storage capacitors $C_s$ to the distributed line capacitance $C_L$ to allow the voltages on the two capacitances $C_L$ and $C_s$ to be equalized. Since in this case, the capacitor $C_s$ is in a discharged state, a significant transfer of charge or current will be caused to flow from the distributed line capacitance $C_L$ to the storage capacitor $C_s$ to cause the storage capacitor $C_s$ to rise toward the voltage $V_R$ imposed on the distributed line capacitance $C_L$. Once voltage equalization between the two capacitors $C_s$ and $C_L$ occurs, the pulse from the word line is discontinued and FET 10 becomes turned off. At this time a pulse 57.1 (10 volts) of phase 1 is now applied once again to terminal 40 causing FET 30 to turn on, to connect the previously charged capacitance $C_d$ to the equalized capacitance $C_L$. A significant amount of charge or current will now flow from capacitor $C_d$ through FET 30 until the capacitor $C_L$ is once again charged towards the voltage $V_R$. The flow of charge in this case is again equal to the amount required to charge the storage capacitor $C_s$ up towards $V_R$. Thus in this instance, when pulse 57.1 turns off $C_d$ is substantially discharged and the sense amplifier 15 indicates, at its output a larger, e.g., nine volt signal 58.1 showing that a significant amount of charge was required to restore capacitor $C_L$ to the lever $V_R$. This means that the original state of capacitor $C_s$ was at a very low or discharged level; and that it drew a considerable amount of current from capacitor $C_L$ indicating that the storage capacitor $C_s$ was in a "0" state.

The amount of charge thus stored in the storage capacitor $C_s$ has been effectively transferred to the detector capacitor $C_d$ with negligable loss and the effect of any distributed parasitic capacitance present on the transfer line has been completely avoided. The invention thus teaches a novel method and a circuit for effectively transferring a capacitive load from a storage capacitor to a detector capacitor through a transfer line without loss due to parasitic or stray capacitances on the transfer line.

Although the invention has been described in conjunction with FET devices, it can also be performed using bipolar transistors.

The present invention thus solves a distinct problem which has hitherto been unresolved by the prior art and does this through the use of a new and novel, simple easily fabricated and easily operated circuit.

Moreover, the present invention performs this transfer in an efficient manner and is easily operable by anyone skilled in the art.

Still further, by making the detector capacitor $C_d$ smaller than the storage capacitor $C_s$, amplification of the stored information can be realized.

While the invention has been particularly shown and described with reference to the preferred embodiment thereof, it will be understood by those skilled in the art that various changes in form and details of the apparatus and method may be made therein without departing from the spirit and scope of the invention and that the method is in no way restricted by the apparatus.

What is claimed is:

1. A circuit for the measurement of charge comprising, a first capacitor for storing a charge, a second capacitor, and a third capacitor, said second capacitor being larger than said first capacitor and said third capacitor, means for applying a reference voltage to said second capacitor and said third capacitor for providing charge thereon, first switch means for selectively connecting said charged second capacitor to said first capacitor, second switch means for selectively connecting said third charged capacitor to said second capacitor for re-charging said second capacitor to its reference voltage, and means coupled to said third capacitor for determining any change in voltage across said third capacitor.

2. The circuit of claim 1 wherein said first and said third capacitors are equal in value.

3. A circuit for effectively transferring a stored charge from a storage capacitor to a measurement capacitor via a transfer line having parasitic capacitances associated therewith comprising, reference voltage setting means coupled between the measurement capacitor and the line, biasing means coupled to the reference voltage setting means for setting a reference voltage on the transfer line to pre-load the parasitic capacitances associated with the line to prevent the line from affecting the effective transfer of the stored charge via the line to the measurement capacitor, means for setting the reference voltage on the measurement capacitor, means for coupling the storage capacitor to the line to permit equalization of voltage between the line and the storage capacitor, means for resetting through the reference voltage setting means the reference voltage on the transfer line from the measurement capacitor, and means coupled to the measurement capacitor for measuring the charge on said measurement capacitor.

4. A circuit for transferring, with negligible loss, a quantity of charge stored in a charge storage system to a charge detector system through a transfer line having parasitic capacitance, coupling the storage system and the detector system, comprising means coupled to the detector system for charging the detector system and the capacitance of the transfer line to a reference voltage, means for selectively coupling the charge storage system to the transfer line to raise the voltage level of the storage system towards the reference voltage by transferring charge from the capacitance of the line to the storage system, and means coupling the detector system to the transfer line for transferring charge from the detector system to the line capacitance to return the line capacitance to the reference voltage so that the voltage remaining on the detector system is indicative of said quantity of charge stored in the storage system.

5. The circuit of claim 4 wherein said charge storage system is the source to ground capacitance of an FET.

6. The circuit of claim 5 wherein said coupling means is an FET.

7. The circuit of claim 6 wherein the means for transferring charge from the detector capacitor to the line capacitance is an FET.

8. A method of measuring with negligible loss, an amount of charge stored in a charge storage system comprising, the steps of coupling a charge storage system through a capacitive transfer line to a charge detection system, having a detector capacitor, charging any stray capacitances in the transfer line to a known reference voltage, charging the detector system to a known reference voltage, connecting the charge storage system to the transfer line to permit voltage equalization between the storage system and the line, decoupling the charge storage system from the line, coupling the detector capacitor to the line to return the line to its known reference voltage, and measuring the charge remaining on the detector capacitor, said remaining charge being substantially equal to the original charge in the storage system.

9. A circuit comprising a charge storage medium, first and second capacitors, means for selectively storing a charge in said charge storage medium, means for charging said first and second capacitors to reference voltages, means coupling said charged first capacitor to said storage medium for discharging a portion of said charge in said first capacitor into said storage medium, means coupling said charged second capacitor to said partially discharged first capacitor for discharging said second capacitor into said first capacitor to re-establish said first capacitor to approximately its reference voltage, and means for determining the amount of charge remaining in said discharged second capacitor.

10. A circuit as set forth in claim 9 wherein said charge storage medium is a third capacitor.

11. A circuit as set forth in claim 9 wherein said first capacitor is substantially larger than said second capacitor.

12. A circuit as set forth in claim 10 wherein said second and third capacitors are substantially of the same value.

13. A circuit comprising a charge storage medium, first and second capacitors, means for selectively storing a charge in said charge storage medium, means for charging said first and second capacitors to reference voltages, means interconnecting said charged first capacitor and said storage medium for altering said charge in said first capacitor, means interconnecting said charged second capacitor and said charge altered first capacitor for altering charge on said second capacitor to re-establish said first capacitor to approximately its reference voltage, and means for determining the amount of charge in said charge altered second capacitor, whereby the amount of charge in said charge altered second capacitor is indicative of the amount of charge selectively stored in said charge storage medium.

* * * * *